United States Patent
Boatright

(10) Patent No.: US 9,787,740 B2
(45) Date of Patent: Oct. 10, 2017

(54) DIGITAL DEVICE, NETWORK AND METHOD FOR STREAMING AUDIO OR VIDEO DATA

(71) Applicant: Harman Becker Automotive Systems GmbH, Karlsbad (DE)

(72) Inventor: Robert Boatright, Karlsbad-Spielberg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 616 days.

(21) Appl. No.: 14/334,505

(22) Filed: Jul. 17, 2014

(65) Prior Publication Data

US 2015/0023372 A1    Jan. 22, 2015

(30) Foreign Application Priority Data

Jul. 17, 2013   (EP) .................................... 13176947

(51) Int. Cl.

| | |
|---|---|
| *H04L 29/06* | (2006.01) |
| *H04N 21/234* | (2011.01) |
| *H04N 21/238* | (2011.01) |
| *H04N 21/436* | (2011.01) |
| *H04L 12/46* | (2006.01) |

(52) U.S. Cl.
CPC ........ *H04L 65/602* (2013.01); *H04L 12/4633* (2013.01); *H04L 12/4645* (2013.01); *H04L 65/4084* (2013.01); *H04L 65/605* (2013.01); *H04L 65/80* (2013.01); *H04N 21/23406* (2013.01); *H04N 21/23805* (2013.01); *H04N 21/43615* (2013.01)

(58) Field of Classification Search
CPC . H04L 65/602; H04L 65/4084; H04L 65/605; H04L 65/80; H04L 12/4633; H04L 12/4645; H04N 21/23406; H04N 21/23805; H04N 21/43615
USPC ........................................................ 370/474
See application file for complete search history.

(56) References Cited

U.S. PATENT DOCUMENTS

| | | | | |
|---|---|---|---|---|
| 9,003,266 | B1 * | 4/2015 | Stirling | ............. H03M 13/1555 714/774 |
| 2008/0284621 | A1 | 11/2008 | Diab et al. | |
| 2009/0158377 | A1 | 6/2009 | Diab et al. | |
| 2010/0312909 | A1 * | 12/2010 | Diab | .................... G06F 1/3209 709/238 |

(Continued)

OTHER PUBLICATIONS

ISA European Patent Office, Extended European Search Report in European Patent Application No. 13176947, Apr. 3, 2014, 6 pages.

(Continued)

*Primary Examiner* — Andrew Chriss
*Assistant Examiner* — Ellen Kirillova
(74) *Attorney, Agent, or Firm* — McCoy Russell LLP

(57) ABSTRACT

A digital device for streaming audio and/or video data has a signal processor configured to process blocks of samples of the audio and/or video data. The signal processor requires a block processing time to respectively process a block of samples. The digital device has an Audio Video Bridging interface configured to generate and transmit frames which include the processed blocks of samples as payload. The Audio Video Bridging interface is configured to set a transmit rate of the frames for at least one traffic class as a function of the block processing time.

16 Claims, 5 Drawing Sheets

(56) References Cited

U.S. PATENT DOCUMENTS

2012/0230348 A1 9/2012 Pannell
2013/0272528 A1* 10/2013 Bushen ............... G06F 13/1663
　　　　　　　　　　　　　　　　　　　　　　381/18

OTHER PUBLICATIONS

Rahmani, M. et al, "A Novel Network Architecture for In-Vehicle Audio and Video Communication," Proceedings of 2nd IEEE/IFIP International Workshop on Broadband Convergence Networks, pp. 1-12, May 2007, 12 pages.

* cited by examiner

DIGITAL DEVICE, NETWORK AND METHOD FOR STREAMING AUDIO OR VIDEO DATA

CROSS REFERENCE TO RELATED APPLICATIONS

The present application claims priority to European Patent Application No. 13176947 filed on Jul. 17, 2013, which is hereby incorporated by reference in its entirety for all purposes.

TECHNICAL FIELD

Various embodiments relate to techniques of streaming audio and/or video data. Various embodiments relate to networks in which audio and/or video data are transmitted from one endpoint to another endpoint and to devices and methods used in such networks.

BACKGROUND

An increasing amount of data, and in particular multimedia content, transmitted over networks has led to increased interest in ways to improve the quality and reliability of streaming data over virtual bridged local area networks. Audio Video Bridging (AVB) allows audio and/or video to be streamed over a local area network. Applications of AVB include streaming compressed and/or uncompressed audio and/or video data between various pieces of equipment. An exemplary transmission may comprise streaming uncompressed audio from an audio/video receiver to multiple networked speakers over an Ethernet network. AVB allows time-synchronized low-latency streaming services to be realized.

The data transmitted using AVB may be encapsulated into frames, in particular Ethernet frames or VLAN-tagged Ethernet frames according to IEEE 802.1Q-2011. Ethernet switches, which are also referred to as AVB bridges, may perform prioritization and traffic shaping as a function of the traffic classes which are respectively assigned to each one of the frames. According to IEEE 802.1Q-2011 as well as other AVB specifications (including, but not limited to, IEEE 802.1AS-2001, IEEE 802.1Qav-2009, and IEEE 802.1Qat-2010), different transmit rates may be used for different traffic classes. For illustration, AVB traffic class A and AVB traffic class B may have fixed transmit rates of 8 kHz and 4 kHz, respectively, assigned to them. Other transmit rates may be assigned to still other traffic classes.

The transmit rates which are conventionally used in an AVB network may require complex logics to retrieve and encapsulate data when a talker transmits frames using AVB.

SUMMARY

There is a need in the art for devices, methods, and systems which mitigate at least some of the shortcomings described above. There is in particular a need in the art for devices, methods, and systems in which a digital device having a digital signal processor may transmit frames using Audio Video Bridging (AVB), without requiring a complex data management for the data which is to be encapsulated into frames.

According to exemplary embodiments of the invention, a signal processor of a device processes blocks of samples. The samples may be sampled audio and/or video data. A block processing time may be required by the signal processor to respectively process a block of samples. A transmit rate for at least one AVB traffic class may be set as a function of the block processing time.

According to exemplary embodiments of the invention, a transmit rate at which frames of at least one AVB traffic class are transmitted by the digital device may be matched to a reciprocal of the block processing time. This simplifies the encapsulation and, if required, buffering of processed data.

According to an embodiment, a digital device configured to stream audio and/or video data is provided. The digital device comprises a signal processor configured to process blocks of samples of the audio and/or video data. The signal processor requires a block processing time to respectively process a block of samples. The digital device comprises an AVB interface configured to generate and transmit frames which include the processed blocks of samples as payload. The AVB interface is configured to set a transmit rate of the frames for at least one traffic class as a function of the block processing time.

According to another embodiment, a network for streaming audio and/or video data is provided. The network comprises an AVB bridge. The AVB bridge comprises an interface to receive frames from a digital device which includes a signal processor requiring a block processing time to process a block of samples of the audio and/or video data. The AVB bridge comprises a control device configured to control the AVB bridge to perform traffic shaping for the received frames. The AVB bridge is operable in accordance with a plurality of different configurations which are respectively associated with different transmit rates of frames for at least one traffic class. The control device is configured to control the AVB bridge to operate in accordance with a configuration which is selected as a function of the block processing time of the signal processor of the digital device from which the frames are received.

According to another embodiment, a method of streaming audio and/or video data is provided. The method comprises processing blocks of samples of the audio and/or video data by a signal processor. The signal processor is configured to respectively process a block of samples in a block processing time. The method comprises setting a transmit rate of an AVB interface for at least one traffic class as a function of the block processing time. The method comprises transmitting frames of the at least one traffic class which include the processed blocks of samples as payload via the AVB interface at the transmit rate which is set as a function of the block processing time.

The method may be performed using a digital device or network according to an embodiment.

Features mentioned above and features yet to be explained may not only be used in isolation or in combination as explicitly indicated, but also in other combinations. Features and embodiments of the present application may be combined unless explicitly mentioned otherwise.

BRIEF DESCRIPTION OF THE DRAWINGS

Various features of embodiments of the present application will become more apparent when read in conjunction with the accompanying drawings. In these drawings.

DETAILED DESCRIPTION

Figure 1:
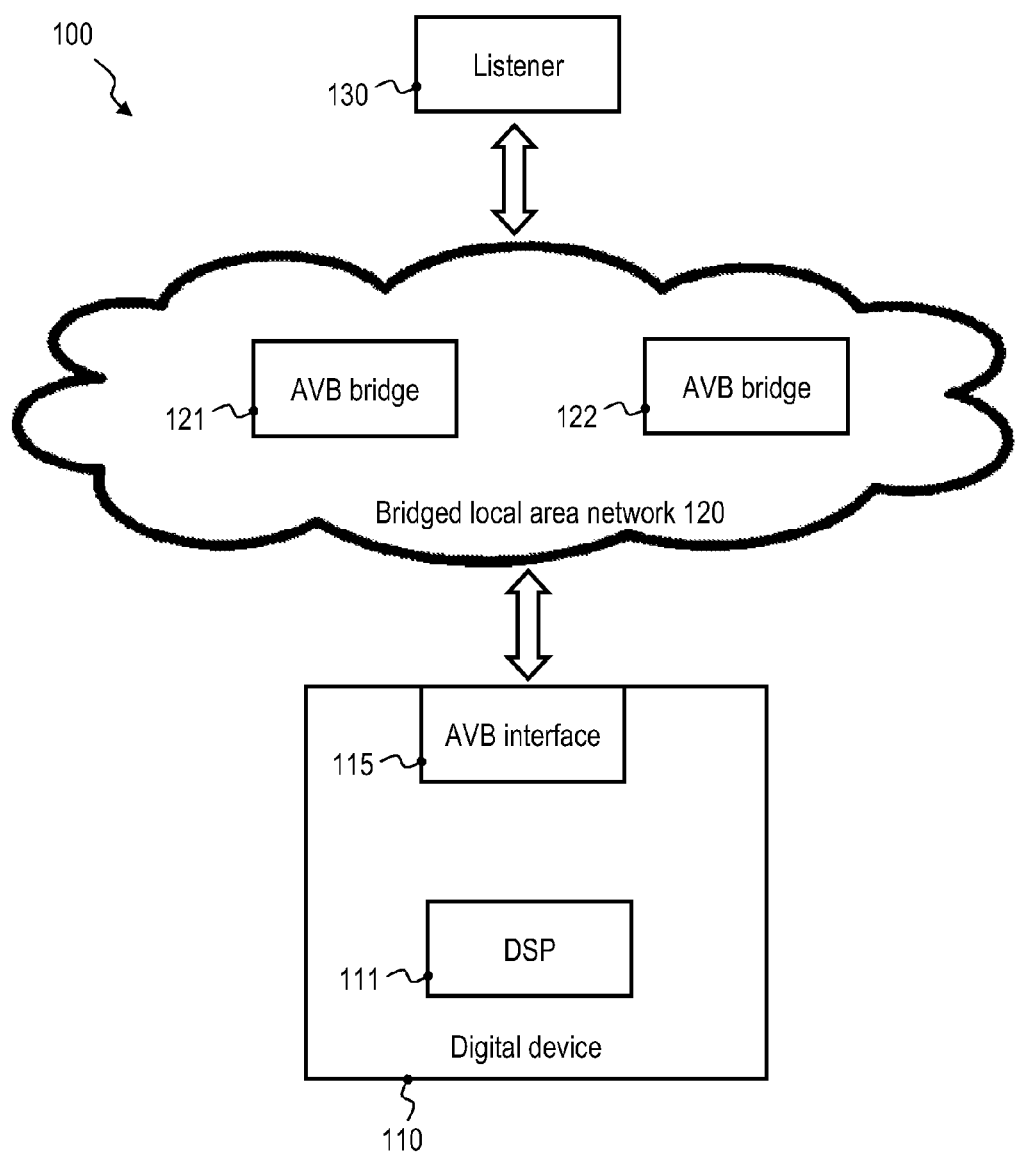
FIG. 1 is a representation of a network according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be taken demonstrative only.

The drawings are to be regarded as being schematic representations and elements illustrated in the drawings are not necessarily shown to scale. Rather, the various elements are represented such that their function and general purpose become apparent for a person skilled in the art. Any connection or coupling between functional blocks, devices, components or other physical or functional units shown in the drawings or described herein may also be implemented by an indirect connection or coupling. A coupling between components may also be established over a wireless connection, unless explicitly stated otherwise. Functional blocks may be implemented in hardware, firmware, software, or a combination thereof.

Hereinafter, techniques are described which allow audio and/or video (A/V) data to be streamed using Audio Video Bridging (AVB). A digital device may generate frames, e.g. Ethernet frames or Ethernet frames having a virtual local area network (VLAN) tag, and may transmit the frames over a virtual bridged local area network (virtual bridged LAN) which includes at least one AVB bridge. The digital device may generate the frames in accordance with one of several traffic classes. The digital device may generate the frames at a transmit rate which depends on the respective traffic class. For at least one of the traffic classes, the transmit rate may be set in dependence on a block processing time required by a signal processor to process a block of samples which is to be encapsulated for transmission. The samples may comprise A/V data.

The signal processor may be a digital signal processor. The signal processor may be an audio/video signal processor, e.g. a microprocessor, processor, application-specific integrated circuit (ASIC), or system on chip (SOC), which may have special purpose processing blocks for processing A/V data.

The transmit rate respectively defines the rate at which frames are transmitted by the digital device.

An identifier for the traffic class may respectively be included in each frame. An AVB bridge may perform prioritization and/or traffic shaping based on the identifiers for the traffic classes included in the frames. The AVB bridge may have a configuration which is set independence on the block processing time of the digital signal processor of the digital device.

The transmit rate for the at least one traffic class (e.g. AVB traffic class C) may be set to be equal to a reciprocal of the block processing time. The transmit rate may be set to be equal to an integer multiple of the block processing time. The AVB interface of the digital device may be controlled in such a way that the transmit rate for the at least one traffic class is matched with the reciprocal of the block processing time of the digital signal processor. The AVB interface of the digital device may be controlled in such a way that the block processing time is equal to a time interval between the times at which transmission of two successive frames is started, or is an integer multiple thereof.

Each block of samples processed by the digital signal processor may have the same, pre-defined number of samples. The rate for the at least one traffic class (e.g. AVB traffic class C) may be set to be proportional to a reciprocal of the pre-defined number of samples included in each block.

FIG. 1 shows a representation of a network 100 according to embodiments. The network 100 may be implemented as an Ethernet AVB network.

The network 100 comprises a digital device 110 having a digital signal processor (DSP) 111. The DSP 111 respectively processes blocks of samples. The samples may be A/V data. The DSP 111 requires a block processing time to respectively process one block of samples. The processed blocks of samples are provided to an AVB interface 115 for transmission. The AVB interface 115 generates and transmits a sequence of frames with a transmit rate. The AVB interface 115 transmits the frames in a regular time interval, which is equal to the reciprocal of the transmit rate and which may be defined as time interval between the times at which the transmission of two successive frames is started. The transmit rate depends on the traffic class for the respective frames. As will be explained in more detail with reference to FIG. 2 to FIG. 10, the transmit rate for at least one traffic class may be set as a function of the block processing time of the DSP 111.

The frames output by the AVB interface 115 are transported through a local area network (LAN) 120 or a wide area network (WAN). The LAN 120 may be a virtual bridged LAN 120 which includes one AVB bridge or several AVB bridges 121, 122. The AVB bridge(s) may respectively be configured as Ethernet switches. Each AVB bridge 121, 122 is respectively configured to perform prioritization and/or traffic shaping in dependence on the traffic classes indicated in headers of the frames received by the respective AVB bridge. Some or all of the frames received at the AVB bridge 121, 122 may have a header indicating that the traffic class belongs to the at least one traffic class for which the transmit rate is set as a function of the block processing time. A configuration of the AVB bridge(s) 121, 122 may be set in dependence on the block processing time of the DSP 111 if required to ensure that the frames generated with the transmit rate that depends on the block processing time are detected by the AVB bridge(s) 121, 122.

The network 100 may include other devices. For illustration, a listener 130 may be connected to the virtual bridged LAN 120. The listener 130 may receive the frames transmitted by the digital device 110 over the virtual bridged LAN 120. The network 100 may comprise a controller. The controller may be configured to manage the flow of one or more data streams between the digital device 110 which acts as a talker and the listener 130. To manage the flow of the data streams, the controller may communicate control messages to the talker and/or the listener 130. The control messages may be Function Block (FBlock) control messages used in accordance with a Media Oriented Systems Transport (MOST) standard. The control messages may be control messages in accordance with a Stream Reservation Protocol (SRP) (e.g. IEEE 802.1Qat-2010) to manage the flow of the data streams over the AVB network 100.

The communication between the various devices of the AVB network 100 may be implemented in accordance with Ethernet AVB protocols. For illustration, the communication may be implemented in accordance with IEEE 802.1Q-2011 relating to Virtual LANs. Alternatively or additionally, the communication may be implemented in accordance with IEEE 802.1AS-2001 for timing and synchronization for time-sensitive applications (gPTP), IEEE 802.1Qav-2009 for forwarding and queuing for time-sensitive streams (FQTSS), and/or IEEE 802.1Qat-2010 for the stream reservation protocol (SRP).

The Ethernet AVB network 100, the digital device 110 and the other devices used in Ethernet AVB network 100 may have any one of a variety of configurations.

In some implementations, the digital device 110 may be an audio and/or video processing device. The digital device 110 may be a mixing console, an amplifier, an audio and/or video hub, or any one of a variety of other devices used in processing and/or distributing A/V data. The AVB network 100 may form a sound processing system.

In other implementations, the AVB network 100 may be a vehicle board network. The digital device 110 may be a receiver for audio and/or video data. The digital device 110 may be any other source of audio and/or video data. The listener 130 may be a loudspeaker, a loudspeaker port or a display installed in a vehicle.

In other implementations, the AVB network 100 may be a home audio/video system or an office audio/video system. The digital device 100 may be a receiver for audio and/or video data. The digital device 110 may be any other source of audio and/or video data. The listener 130 may be a loudspeaker or display. Several listeners 130 may be provided to receive data from the digital device 110.

The AVB network 100 may be an Ethernet AVB network. Devices of the Ethernet AVB network may communicate with each other through an Ethernet connection, such as using a cable or wireless connection to an Ethernet AVB network. Various other connections may be used in other implementations.

The operation of the digital device 110 and of various other devices of the network 100 will be described in more detail with reference to FIG. 2 to FIG. 10.

Figure 2:
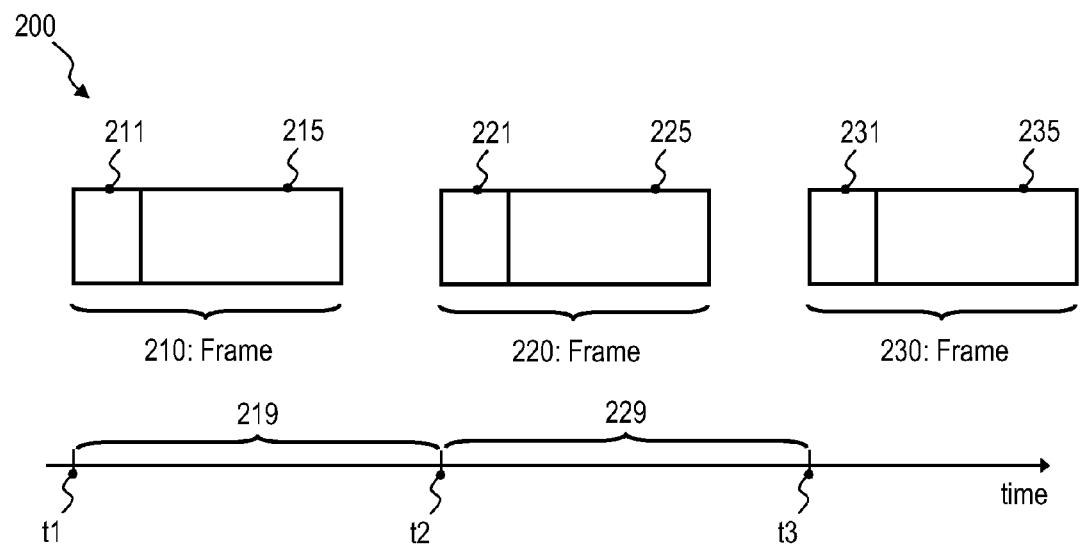
FIG. 2 shows a sequence of frames transmitted by a digital device according to an embodiment.

FIG. 2 is a schematic representation of sequence 200 of frames transmitted by a digital device according to an embodiment. The sequence 200 includes a plurality of frames. A first frame 210, a second frame 220, and a third frame 230 are shown for illustration, it being understood that a greater or smaller number of frames may be included in the sequence 200. The frames 210, 220, 230 may respectively be Ethernet frames. The frames 210, 220, 230 may respectively be VLAN-tagged Ethernet frames as defined in IEEE 802.1Q-2011.

The first frame 210 may include a header 211 and payload 215. The payload 215 may include the data output by the DSP 111 when the DSP 111 processes a first block of samples. The payload 215 may include the full processed first block of samples, but does not include data from a preceding or subsequent block of samples processed by the DSP 111.

The second frame 220 may include a header 221 and payload 225. The payload 225 may include the data output by the DSP 111 when the DSP 111 processes a second block of samples. The payload 225 may include the full processed second block of samples, but does not include data from the first block of samples or a third block of samples.

The third frame 230 may include a header 231 and payload 235. The payload 235 may include the data output by the DSP 111 when the DSP 111 processes the third block of samples. The payload 235 may include the full processed third block of samples, but does not include data from the second block of samples or a subsequent block of samples.

The DSP 111 starts transmission of the first frame 210 at a time t1. The DSP 111 starts transmission of the second frame 220 at a time t2. A first time interval 219 between the time t1 at which transmission of the first frame 210 is started and the time t2 at which transmission of the second frame 220 is started is equal to a reciprocal of the transmit rate. The DSP starts transmission of a third frame 230 at a time t3. A second time interval 229 between the time t2 at which transmission of the second frame 220 is started and the time t3 at which transmission of the third frame 230 is started is equal to a reciprocal of the transmit rate. The first time interval 219 and the second time interval 229 may have equal length.

When the frames 210, 220, 230 are respectively associated with a pre-determined AVB traffic class, e.g. AVB traffic class C, the transmit rate may be controlled in dependence on the block processing time of the DSP 111. Accordingly, the time interval(s) 219, 229 between transmissions of successive frames may be set in dependence on the block processing time of the DSP 111.

The digital device 110 may generate a sequence of frames 210, 220, 230 which are all associated with a pre-determined AVB traffic class, e.g. AVB traffic class C as defined in IEEE 802.1Q-2011. The digital device 110 may set a transmit rate for transmitting the frames of the sequence in dependence on the block processing time of the DSP 111.

Vice versa, the AVB bridge(s) and/or other devices in the AVB network 100 may be have a configuration which is set in dependence on the transmit rate of the digital device 110, which in turn depends on the block processing time of the DSP 111 for at least one traffic class.

In some embodiments of the invention, the transmit rate for at least one AVB traffic class may be set according to $$f_{tr}=m\cdot(1/T_{bproc}),\qquad(1)$$

where $f_{tr}$ denotes the transmit rate, $T_{bproc}$ denotes the block processing time of the DSP 111, and m is an integer multiplier.

In some embodiments of the invention, the multiplier in Equation (1) may be equal to one. In other embodiments, the multiplier in Equation (1) may be an integer greater than one.

In some embodiments of the invention, the transmit rate for at least one AVB traffic class may be set according to $$f_{tr}=m\cdot(f_{clock}/N_s),\qquad(2)$$

where $f_{tr}$ denotes the transmit rate, $f_{clock}$ denotes a clock rate of the DSP 111, $N_s$ denotes the pre-determined number of samples in each block of samples processed by the DSP 111, and m is an integer multiplier.

In some embodiments of the invention, the multiplier in Equation (2) may be equal to one. In other embodiments, the multiplier in Equation (2) may be an integer greater than one.

By setting the transmit rate in accordance with Equation (1) and/or Equation (2), the transmit rate may be matched with the reciprocal of the block processing time. For illustration, for the multiplier m being equal to one, the time intervals 219, 229 between the times at which transmission of successive frames is started is equal to the block processing time. For further illustration, for the multiplier m being an integer greater than one, the block processing time is an integer multiple of the time intervals 219, 229 between the times at which transmission of successive frames is started.

The transmit rate set in accordance with Equation (1) and/or Equation (2) may apply to only one AVB traffic class or to several AVB traffic classes. The transmit rate for AVB traffic classes A and B may have pre-defined values which are independent of the block processing time of the DSP 111. A transmit rate set in accordance with Equation (1) and/or Equation (2) may be used for at least one AVB traffic class different from AVB traffic classes A and B.

The AVB traffic class for frames transmitted by the DSP 111 does not only determine the transmit rate at which the frames are generated and transmitted, but may also be used by the virtual bridged LAN for traffic shaping. An indicator for the AVB traffic class may respectively be included in each one of the frames in which a processed block of samples is encapsulated. The frames may respectively be configured as Ethernet frames having an added 802.1Q header as defined in IEEE 802.1Q-2011. The 802.1Q header may be inserted between a source MAC address field and an EtherType/Length field of a conventional Ethernet frame. The 802.1Q header may include a Priority Code Point (PCP). The PCP may be a three-bit field. The PCP may define the AVB traffic class of the respective frame. Time intervals between frames transmitted by the digital device 110 may depend on the AVB traffic classes included in the respective frames, with the time intervals being dependent on the block processing time of the DSP 111 for at least one traffic class.

Figure 3:
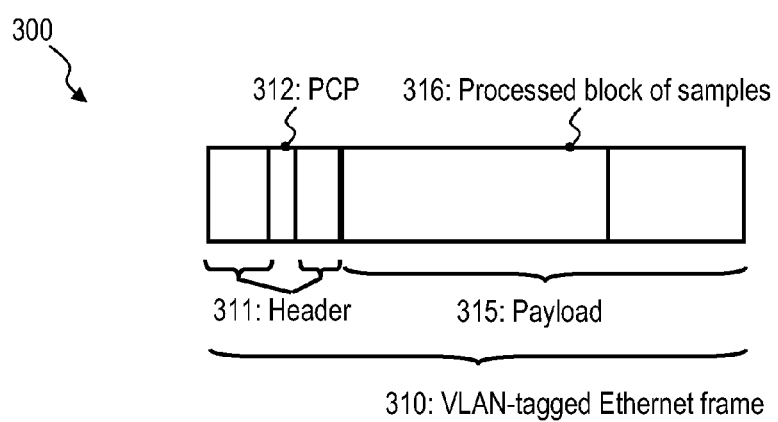
FIG. 3 shows a frame transmitted by a digital device according to an embodiment.

FIG. 3 shows a frame 300 which may be generated by a digital device 110 according to an embodiment. The frame 300 may be a VLAN-tagged Ethernet frame 310 as defined by IEEE 802.1Q-2011. The VLAN-tagged Ethernet frame 310 has a header 311 which includes the bit fields of a conventional Ethernet frame. The header 311 may include a preamble, a destination machine access code (MAC), a source MAC, and an EtherType/Length field. A bit field 312 as defined in IEEE 802.1Q-2011 may be added between the source MAC field and the EtherType/Length field. The bit field 312 may include the PCP field. Information on the priority of the frame, e.g. an indicator for the AVB traffic class, may be stored in the PCP field.

The VLAN-tagged Ethernet frame 310 includes a payload field 315. The data 316 generated by the DSP 111 when it processes one block of samples by the DSP 111 may be included in the payload field 315.

The VLAN-tagged Ethernet frame 310 may include other fields, e.g. field used for a cyclic redundancy check (CRC) or other control data.

The configuration and operation of a digital device according to embodiments will be described in more detail with reference to FIG. 4 to FIG. 9.

Figure 4:
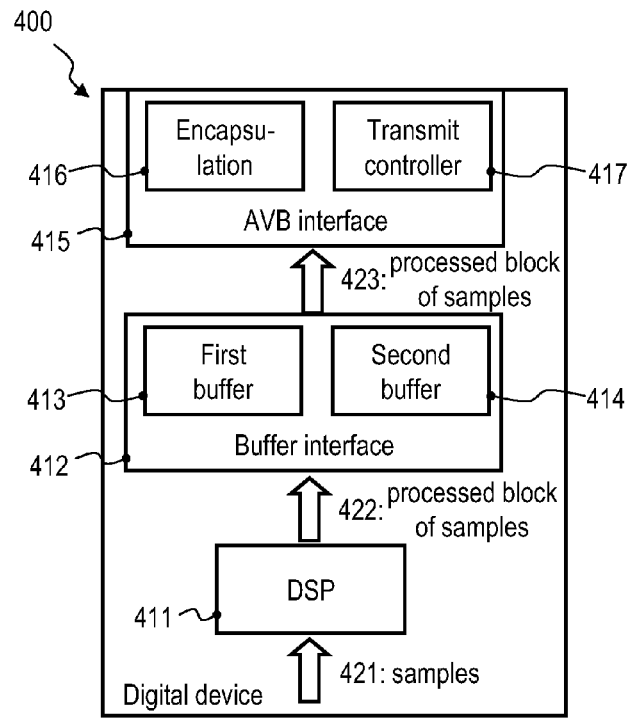
FIG. 4 is a block diagram of a digital device according to an embodiment.

FIG. 4 is a block diagram of a digital device 400 according to an embodiment. The digital device 400 may be used as digital device 110 in the network 100 of FIG. 1.

The digital device 400 comprises a DSP 411, a buffer interface 412, and an AVB interface 415. The DSP 411 receives samples 421. The samples 421 may be sampled audio and/or video data. The samples 421 may be digital data. The DSP 411 processes a block of the samples 421. Each block may consist of a pre-defined number of samples, e.g. 64 samples.

The DSP outputs the processed block of samples 422 to the buffer interface 412. The processed block of samples 422 may be buffered by the buffer interface 412 before it is encapsulated in a frame for transmission. The buffer interface 412 may comprise a first buffer 413 and a second buffer 414. The buffer interface may be configured such that, for generating one frame having a traffic class for which the transmit rate depends on the block processing time of the DSP 411, data 423 is read from only one of the first buffer 413 and the second buffer 414. When the subsequent frame is generated, data 423 may be read from the other one of the first buffer 413 and the second buffer 414. The first buffer 413 may be a first FIFO (first-in-first-out) buffer. The second buffer 414 may be a second FIFO buffer.

The buffer interface 412 may be configured as a ping pong buffer interface. The buffer interface 412 may be operative to direct successive processed bocks of samples which are written into the buffer interface to the first buffer 413 and the second buffer 414 in an alternating manner. The buffer interface 412 may be operative to read data supplied to the AVB interface 415 from the second buffer 414 and the first buffer 413 in an alternating manner. The buffer interface 412 may be operative such that, when data is read from one of the first buffer 413 and the second buffer 414 for generating a frame, a processed block of samples supplied by the DSP 411 is concurrently written into the other one of the first buffer 413 and the second buffer 414.

The AVB interface 415 is configured to retrieve data from the buffer interface 412. The AVB interface 415 may include an encapsulation unit 416 which encapsulates a processed block of samples in an associated frame. The frame may be a VLAN-tagged Ethernet frame as defined in 801.1Q-2011.

The AVB interface 415 may include a transmit controller 417. The transmit controller 417 may control a timing at which frames are generated and transmitted. The transmit controller 417 may control the AVB interface 415 such that the generation of a new frame is started upon expiry of a time interval. The time interval is the reciprocal of the transmit rate. For at least one traffic class, e.g. for AVB traffic class C, the transmit rate may depend on the block processing time of the DSP 411. The transmit rate may depend on the block processing time of the DSP 411 as explained with reference to Equations (1) and (2) above. The length of the time interval after which the transmission of a new frame is started may be made equal to the block processing time of the DSP 411 as explained with reference to Equations (1) and (2) above.

The transmit controller 417 may retrieve information on the block processing time of the DSP 411 and may control operation of the AVB interface 415 based on the retrieved information on the block processing time. The transmit controller 417 may retrieve the information on the block processing time from a non-volatile memory of the digital device 400.

Operation of the digital device 400 according to an embodiment will be explained in more detail with reference to FIG. 5 to FIG. 8.

Figure 5:
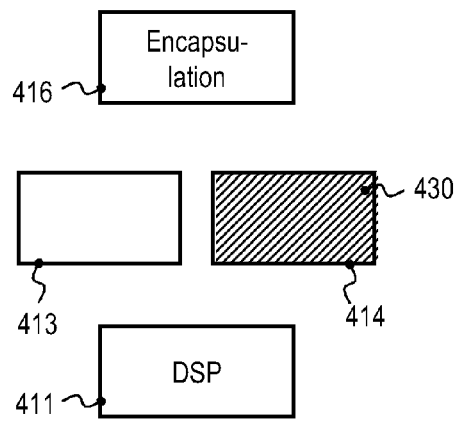
FIG. 5 illustrates an operation state of the digital device of FIG. 4.

FIG. 5 shows an operation state of the digital device 400 in which a processed block of samples 430 has been written into the second buffer 414.

Figure 6:
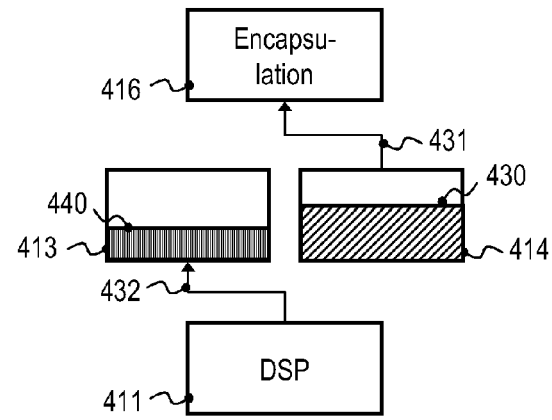
FIG. 6 illustrates another operation state of the digital device of FIG. 4.

FIG. 6 shows an operation state of the digital device 400 in which the processed block of samples 430 is retrieved by the encapsulation unit 416. The encapsulation unit 416 may perform a read operation 431 to retrieve the processed block of samples 430 and may generate a frame which includes the processed block of samples 430 as payload.

Another processed block of samples 440 may be written into the first buffer 413 by the DSP 411 in a write operation 432. The write operation 432 may be performed concurrently with the read operation 431.

Figure 7:
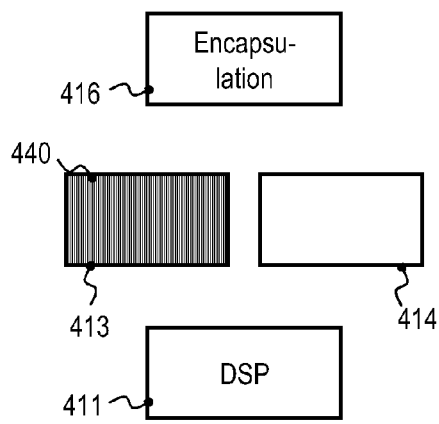
FIG. 7 illustrates another operation state of the digital device of FIG. 4.

FIG. 7 shows an operation state of the digital device 400 in which the read operation 431 and the write operation 432 have been completed. The other processed block of samples 440 is buffered in the first buffer 413.

Figure 8:
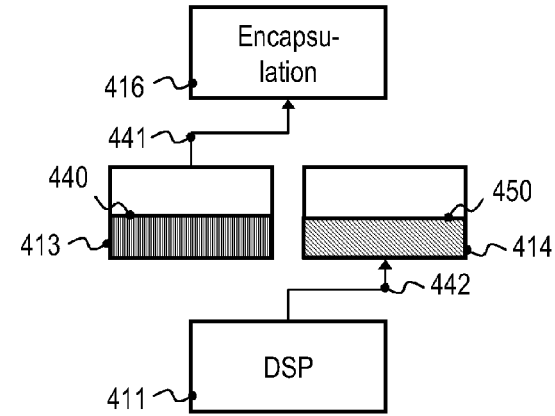
FIG. 8 illustrates another operation state of the digital device of FIG. 4.

FIG. 8 shows an operation state of the digital device 400 in which the other processed block of samples 440 is retrieved by the encapsulation unit 416. The encapsulation unit 416 may perform a read operation 441 to retrieve the other processed block of samples 440 and may generate another frame which includes the other processed block of samples 440 as payload.

Yet another processed block of samples 450 may be written into the second buffer 414 by the DSP 411 in a write operation 442. The write operation 442 may be performed concurrently with the read operation 441.

The various operation states explained with reference to FIG. 5 to FIG. 8 may be cyclically repeated.

Figure 9:
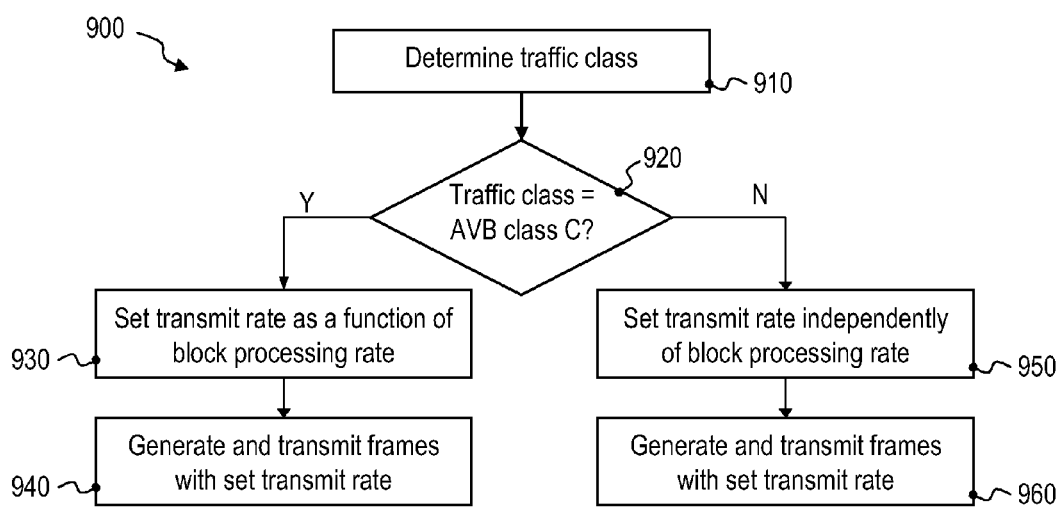
FIG. 9 is a flow chart of a method according to an embodiment.

FIG. 9 is a flow chart of a method 900 according to an embodiment. The method 900 may be performed by digital device or a network according to an embodiment.

At 910, a traffic class is determined for streaming audio and/or video data. The traffic class may be selected from a plurality of pre-defined traffic classes. The traffic class may define a priority with which the respective frames are handled by AVB bridges of a virtual bridged LA/V. The traffic class may be selected from a group which includes AVB traffic class A, AVB traffic class B, and AVB traffic class C. The traffic class may be selected from a group which includes AVB traffic class A, AVB traffic class B, and AVB traffic class C as defined in IEEE 802.1Q-2011.

At 920, it is determined whether the traffic class is AVB class C. If the traffic class is AVB class C, the method proceeds to 930.

At 930, a transmit rate is set as a function of the block processing time of a digital signal processor of the digital device which acts as talker. The transmit rate may be set as explained with reference to Equations (1) and (2) above.

At 940, frames are generated and transmitted with the transmit rate which depends on the block processing time of the digital signal processor. Each frame may be generated to include an indicator for the traffic class, i.e., for AVB class C. Each frame may be generated as a VLAN-tagged Ethernet frame as defined in IEEE 802.1Q-2011 which has an indicator for AVB class C in its PCP field.

If it is determined at step 920 that the traffic class is not AVB class C, the method proceeds to 950.

At 950, a transmit rate is set which is independent of the block processing time of the digital signal processor of the digital device which acts as talker. The transmit rate may be set to a fixed transmit rate for AVB class A or for AVB class B, as defined by IEEE 802.1Q-2011, for example.

At 960, frames are generated and transmitted with the transmit rate which is independent of the block processing time of the digital signal processor. Each frame may be generated to include an indicator for the traffic class, e.g. for AVB class A or AVB class B. Each frame may be generated as a VLAN-tagged Ethernet frame as defined in IEEE 802.1Q-2011 which has an indicator for the traffic class in its PCP field.

The traffic class indicated by the frames transmitted by the digital device may be used by other devices of an AVB network for traffic shaping and/or prioritization. For illustration, AVB bridges may perform traffic shaping and/or prioritization based on the traffic class indicated by the frames transmitted by the digital device.

At least one AVB bridge or another device of the AVB network may be configured in dependence on the block processing time of the DSP of the digital device. This may be done in various ways. In some implementations, a controller may set a configuration of an AVB bridge or several AVB bridges and, optionally, of other devices of the AVB network in dependence on the block processing time of a digital signal processor of a digital device. Alternatively or additionally, the digital device may perform signaling to indicate the transmit rate which it uses for transmitting frames having a certain traffic class. The digital device may utilize messages defined in IEEE 802.1Qat-2010 or any other signaling defined in IEEE 802.1Q-2011 which allows the digital device to signal latency to other devices. Because the latency and the transmit rate are related to one another, the digital device may use latency signaling for informing AVB bridge(s) or other devices of the transmit rate set as a function of the block processing time.

Figure 10:
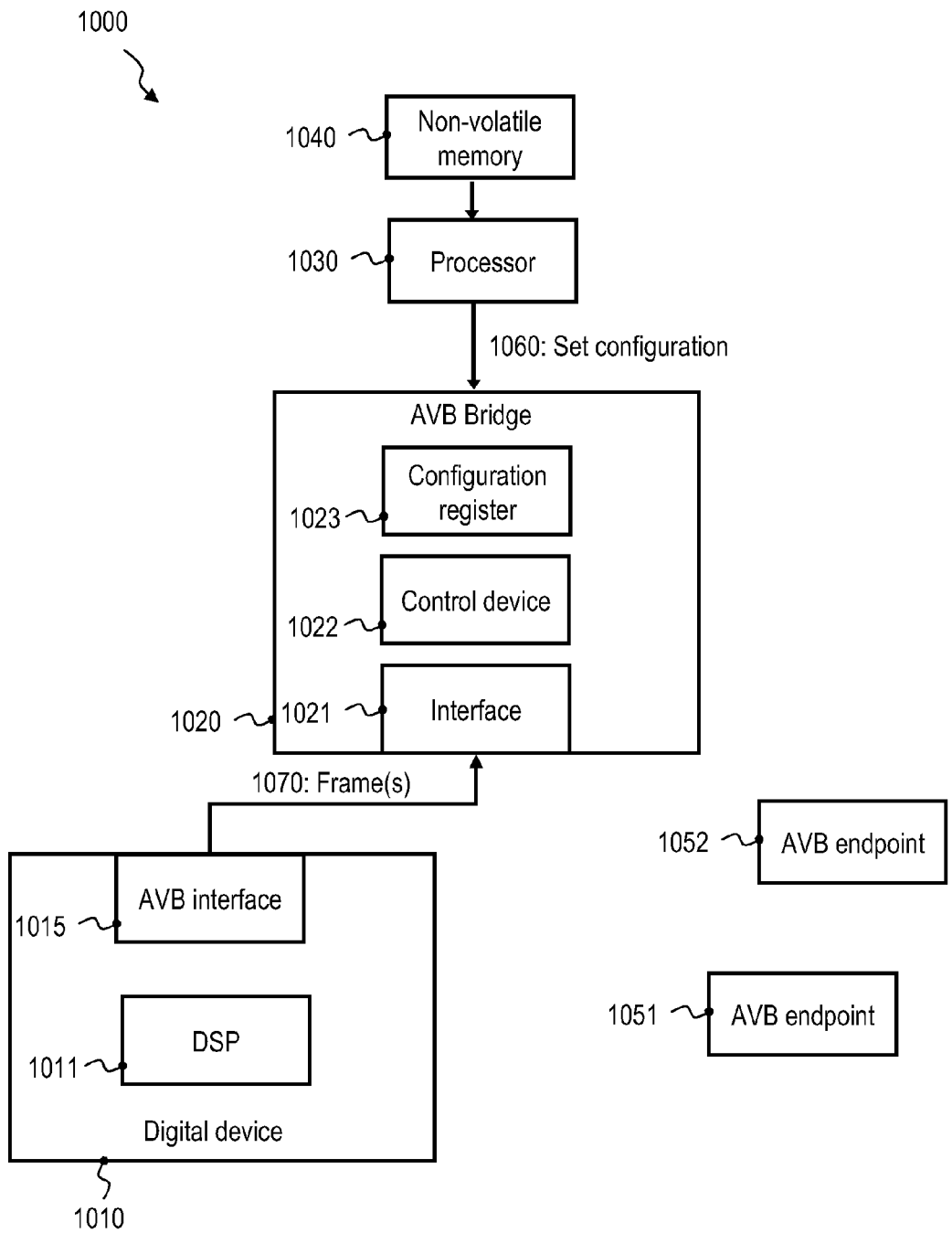
FIG. 10 is a representation of a network according to various embodiments.

FIG. 10 is a diagram of a network 1000 according to an embodiment. The network 1000 may be configured as Ethernet AVB network. The network 1000 comprises a digital device 1010. The digital device 1010 comprises a DSP 1011 and an AVB interface 1015. The digital device 1010 may have any one of the configurations explained with reference to FIG. 2 to FIG. 9 above.

The network 1000 comprises an AVB bridge 1020. The AVB bridge 1020 comprises an interface 1021 to receive frames 1070 transmitted by the digital device 1010. The AVB bridge 1020 may be configured to perform traffic shaping in dependence on a traffic class indicator included in the frames 1070. The AVB bridge 1020 may be an Ethernet switch which routes frames received from the digital device 1010. The AVB bridge 1020 may include a control device 1022. The control device 1022 may be operative to perform traffic shaping and/or prioritization. The AVB bridge 1020 may include one buffer or several buffers. The control device 1022 may control the outputting of frames buffered in the buffer(s) of the AVB bridge 1020 in dependence on the traffic class respectively assigned to each one of the frames.

In order to ensure that the AVB bridge 1020 can reliably receive frames transmitted by the digital device 1010 with a transmit rate that depends on the block processing time of the DSP 1011, the AVB bridge 1020 may be configurable such that it can be set to any one of a plurality of configurations. The AVB bridge 1020 may have a configuration register 1023 which stores operation parameters for various configurations. The configuration register 1023 may define time intervals between successive frames, for example. The control device 1022 may retrieve information on a configuration to which the AVB bridge 1020 is to be set from the configuration register 1023. The control device 1022 may control operation of the AVB bridge as a function of the selected configuration.

In some implementations, the AVB bridge 1020 may be operative to determine the appropriate configuration based on signal messages transmitted from the digital device 1010. For illustration, the digital device 1010 may signal a latency to the AVB bridge 1020. The AVB bridge 1020 may determine the transmit rate of the digital device 1010 based on the signaled latency. The AVB bridge 1020 may operate in accordance with a configuration which depends on the transmit rate of the digital device 1010 and, for at least on traffic class, depends on the block processing time of the DSP 1011.

In other implementations, the configuration of the AVB bridge 1020 may be controlled by a processor 1030. The processor 1030 may be an external host processor, for example. Information on the block processing time of the DSP 1011 may be stored in a non-volatile memory 1040. The processor 1030 may determine a configuration to which the AVB bridge 1020 shall be set based on the information on the block processing time of the DSP 1011. The processor 1030 may issue a set configuration command 1060 to the AVB bridge 1020 to set the configuration of the AVB bridge 1020 such that it is in conformity with the transmit rate at which the digital device 1010 transmits frames.

The network 1000 may include other devices. For illustration, the network 1000 may include one or several further AVB endpoint(s) 1051, 1052. The processor 1030 may optionally control the configuration of the further AVB endpoint(s) 1051, 1052 in dependence on the block processing time of the DSP 1011. Alternatively or additionally, signaling between the digital device 1010 and the further AVB endpoint(s) 1051, 1052 may be performed to inform the further AVB endpoint(s) 1051, 1052 of the set transmit rate of the digital device 1010, if the further AVB endpoint(s) require this information.

While embodiments have been described in detail with reference to the drawings, various modifications and alterations may be implemented in other embodiments.

For illustration, while the digital device may include a ping-pong buffer interface in some embodiments, other buffer configurations may be used in other embodiments. For further illustration, while the digital device may be configured to generate and transmit frames in accordance with IEEE 802.1Q-2011 in some embodiments, other data frames may be used in other embodiments. For still further illustration, while the digital device may be configured to variably set a transmit rate in dependence on a DSP block processing time for some traffic classes while using a fixed transmit rate for other traffic classes in some embodiments, the digital device may be configured to consistently generate frames of a traffic class for which the transmit rate depends on the DSP block processing time in other embodiments. For still further illustration, while the signal processor may be a digital signal processor in some embodiments, any one of a variety of configurations may be used for the signal processor in other embodiments. For illustration, the signal processor may include one or several of a microprocessor, processor, application-specific integrated circuit (ASIC), or system on chip (SOC), which may have special purpose processing blocks for processing A/V data. For still further illustration, a network may include several digital devices which are configured to set a transmit rate respectively as a function of a block processing time of a signal processor.

Devices, networks, and methods according to embodiments may be used for streaming audio and/or video data in vehicle board networks, in music processing equipment, or in home or office audio and/or video installations, without being limited thereto.

Although the invention has been described with respect to certain preferred embodiments, various modifications will occur to the person skilled in the art. The invention is only limited by the scope of the appended claims.

The invention claimed is:

1. A digital device for streaming audio and/or video data, comprising:
   a signal processor configured to process blocks of samples of the audio and/or video data, the signal processor requiring a block processing time to respectively process a block of samples; and
   an Audio Video Bridging, AVB, interface configured to generate and transmit frames which include the processed blocks of samples as payload, the AVB interface being configured to set a transmit rate of the frames for at least one traffic class as a function of the block processing time,
   wherein the AVB interface comprises a transmit controller configured to control the AVB interface to:
   transmit frames having a first traffic class with a first transmit rate which is independent of the block processing time, and
   transmit frames having a second traffic class with a second transmit rate which is set as a function of the block processing time.

2. The digital device of claim 1,
   wherein the AVB interface is configured to control the transmit rate of the frames for the at least one traffic class such that the transmit rate is equal to a reciprocal of the block processing time or is an integer multiple of the block processing time.

3. The digital device of claim 1,
   wherein the signal processor is configured such that each block of samples includes a pre-defined number of samples,
   wherein the AVB interface is configured to set the transmit rate of the frames for the at least one traffic class such that the transmit rate is proportional to a reciprocal of the pre-defined number of samples.

4. The digital device of claim 1,
   wherein the first traffic class is selected from AVB class A and AVB class B, and wherein the second traffic class is AVB class C.

5. The digital device of claim 1,
   wherein the AVB interface is configured to encapsulate each processed block of samples respectively in an Ethernet frame provided with a virtual local area network, VLAN, tag, and
   wherein the AVB interface is configured to generate the VLAN tag having an indicator for the traffic class of the frame included in a Priority Code Point field of the VLAN tag.

6. The digital device of claim 1, further comprising:
   a buffer interface coupled to the signal processor and the AVB interface, the buffer interface comprising a first buffer and a second buffer to buffer the processed blocks of samples.

7. The digital device of claim 6,
   wherein the AVB interface is configured to read data only from the first buffer to generate a first frame and to read data only from the second buffer to generate a second frame which is transmitted in succession to the first frame.

8. The digital device of claim 1,
   wherein the AVB interface is configured to transmit at least one signal message indicating the transmit rate which is set as a function of the block processing time.

9. A network for streaming audio and/or video data, the network comprising:
   an Audio Video Bridging, AVB, bridge comprising:
   an interface to receive frames from a digital device which includes a signal processor requiring a block processing time to process a block of samples of the audio and/or video data, and
   a control device configured to control the AVB bridge to perform traffic shaping for the received frames,
   wherein the AVB bridge is operable in accordance with a plurality of different configurations which are respectively associated with different transmit rates of frames for at least one traffic class, the control device being configured to control the AVB bridge to operate in accordance with a configuration which is selected as a function of the block processing time of the signal processor of the digital device from which the frames are received, and wherein the digital device comprises:
the signal processor, and
an AVB interface configured to generate and transmit the frames such that the frames include the processed blocks of samples as payload, the AVB interface being configured to transmit the frames to the AVB bridge with a transmit rate which is selected from the different transmit rates and which is a function of the block processing time.

10. The network of claim 9, further comprising:
a processor coupled to the AVB bridge and configured to set the configuration of the AVB bridge as a function of the block processing time.

11. A method of streaming audio and/or video data, the method comprising:
processing blocks of samples of the audio and/or video data by a signal processor, wherein the signal processor is configured to respectively process a block of samples in a block processing time;
setting a transmit rate of an Audio Video Bridging, AVB, interface for at least one traffic class as a function of the block processing time; and
transmitting frames of the at least one traffic class which include the processed blocks of samples as payload via the AVB interface with the transmit rate which is set as a function of the block processing time,
wherein each block of samples includes a pre-defined number of samples, and
wherein the transmit rate of the frames for the at least one traffic class is set such that the transmit rate is proportional to a reciprocal of the pre-defined number of samples.

12. The method of claim 11,
wherein the transmit rate of the frames for the at least one traffic class is set such that the transmit rate is equal to a reciprocal of the block processing time or is an integer multiple of the block processing time.

13. The method of claim 11,
wherein the AVB interface comprises a transmit controller which controls the AVB interface to transmit frames having AVB class C with the transmit rate which is set as a function of the block processing time.

14. The method of claim 11, further comprising:
buffering the processed blocks of samples by a buffer interface which comprises a first buffer and a second buffer.

15. The method of claim 14,
wherein the AVB interface reads data only from the first buffer to generate a first frame and reads data only from the second buffer to generate a second frame which is transmitted in succession to the first frame.

16. The method of claim 11, further comprising:
transmitting at least one signal message by the AVB interface, the at least one signal message indicating the transmit rate which is set as a function of the block processing time.

* * * * *